US012501169B2

United States Patent
Asselman et al.

(10) Patent No.: US 12,501,169 B2
(45) Date of Patent: Dec. 16, 2025

(54) METHOD AND IMAGE CAPTURING APPARATUS

(71) Applicant: KONINKLIJKE PHILIPS N.V., Eindhoven (NL)

(72) Inventors: Michel Jozef Agnes Asselman, Helmond (NL); Mathivanan Damodaran, 'S-Hertogenbosch (NL); Yannyk Parulian Julian Bourquin, Eindhoven (NL); Jonathan Alambra Palero, Waalre (NL); Rieko Verhagen, Vught (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 295 days.

(21) Appl. No.: 18/280,696

(22) PCT Filed: Feb. 25, 2022

(86) PCT No.: PCT/EP2022/054884
§ 371 (c)(1),
(2) Date: Sep. 7, 2023

(87) PCT Pub. No.: WO2022/189176
PCT Pub. Date: Sep. 15, 2022

(65) Prior Publication Data
US 2024/0155246 A1    May 9, 2024

(30) Foreign Application Priority Data

Mar. 11, 2021 (EP) .................................. 21161955

(51) Int. Cl.
*H04N 23/71* (2023.01)
*G06T 5/50* (2006.01)
(Continued)

(52) U.S. Cl.
CPC ............... *H04N 23/71* (2023.01); *G06T 5/50* (2013.01); *G06T 5/80* (2024.01); *H04N 23/74* (2023.01)

(58) Field of Classification Search
None
See application file for complete search history.

(56) References Cited

U.S. PATENT DOCUMENTS

| 8,004,502 B2 | 8/2011 | Keam |
| 2004/0080623 A1 | 4/2004 | Cleveland et al. |

(Continued)

FOREIGN PATENT DOCUMENTS

| WO | WO-2011009005 A2 * | 1/2011 | ........... G06F 3/0383 |
| WO | 2022189060 A1 | 9/2022 | |

OTHER PUBLICATIONS

Amir et al., "Light Source Separation from Image Sequences of Oscillating Lights", 2014 IEEE 28th Convention of Electrical & Electronics Engineers in Israel (IEEEI), IEEE, Dec. 3, 2014, pp. 1-5.

(Continued)

*Primary Examiner* — David Ometz (57) ABSTRACT

According to an aspect, there is provided a method for minimising error in ambient light corrected (ALC) images due to motion. The method comprises capturing a plurality of primary images of an object over a time window, with controlled illumination of the object varying over time, performing ambient light correction on at least a portion of the plurality of primary images to generate a plurality of ambient light corrected images, each ALC image being generated based on demodulating a sub-set of the plurality of primary images with differing controlled illumination, calculating an error value for pairs of ALC images, each pair of ALC images including a first ALC image and a second ALC image and comparing the error values for each pair of (Continued)

ALC images and selecting an error-minimised image from the pair of ALC images having the lowest error value within the time window Calculating the error value comprises comparing each pixel of the first ALC image with a corresponding pixel of the second ALC image, and determining a change in intensity for each pixel between the first ALC image and the second ALC image, and calculating an error value for the pair of ALC images based on the change in intensity over a plurality of pixels.

14 Claims, 7 Drawing Sheets (51) Int. Cl.
*G06T 5/80* (2024.01)
*H04N 23/74* (2023.01)

(56) References Cited

U.S. PATENT DOCUMENTS

| 2006/0091288 | A1 | 5/2006 | Keam et al. |
| 2006/0238714 | A1* | 10/2006 | Fox ............... G06V 20/56 352/49 |
| 2007/0263099 | A1 | 11/2007 | Motta et al. |
| 2009/0091554 | A1* | 4/2009 | Keam ............. G06F 3/0418 345/175 |
| 2014/0313401 | A1 | 10/2014 | Rihn et al. |
| 2016/0360083 | A1 | 12/2016 | Nilsson |
| 2022/0400221 | A1 | 12/2022 | Palero et al. |
| 2023/0089886 | A1 | 3/2023 | Damodaran et al. |

OTHER PUBLICATIONS

Szeliski et al., "Prediction Error as a Quality Metric for Motion and Stereo", Vision Technology Group, Microsoft Research One Microsoft Way, Redmond, WA.
International Search report and Written Opinion of PCT/EP2022/054884, dated Feb. 25, 2022.

* cited by examiner

METHOD AND IMAGE CAPTURING APPARATUS

CROSS-REFERENCE TO PRIOR APPLICATIONS

This application is the U.S. National Phase application under 35 U.S.C. § 371 of International Application No. PCT/EP2022/054884, filed on Feb. 25, 2022, which claims the benefit of European Patent Application No. 21161955.6, filed on Mar. 11, 2021. These applications are hereby incorporated by reference herein.

FIELD OF THE INVENTION

The present invention relates to a method of obtaining an ambient light correction (ALC) image having a minimised error due to motion, and an image capturing apparatus for the same.

BACKGROUND OF THE INVENTION

Images captured by a camera or image capturing device of an object are often illuminated by ambient light as well as a separate source of illumination. In order to be able to accurately compare images of the same object, or determine colours of an object, the ambient light must be corrected for to produce an ambient light corrected image. However, such images are often generated by comparing pixels of captured images, which introduces errors when there is any movement of the object between frames.

US 2016/360083 discloses a device and method of capturing a video frame using an electronic device to provide enhanced video. A first sub-frame is captured using ambient light, and a second sub-frame is captured using ambient light and a light source under control of the electronic device. A primary frame is generated based on a combination of the first sub-frame and the second sub-frame. It discloses detecting motion of an object captured and modifying the second sub-frame to compensate for the detected motion.

SUMMARY OF THE INVENTION

According to a first specific aspect, there is provided a method for obtaining an ambient light correction (ALC) image having a minimised error due to motion. The method comprises: capturing a plurality of primary images of an object over a time window, with controlled illumination of the object varying over time; performing ambient light correction on at least a portion of the plurality of primary images to generate a plurality of ALC images, each ALC image being generated based on demodulating a sub-set of the plurality of primary images with differing controlled illumination; calculating an error value for pairs of ALC images, each pair of ALC images including a first ALC image and a second ALC image. Calculating the error value comprises: comparing each pixel of the first ALC image with a corresponding pixel of the second ALC image, and determining a change in intensity for each pixel between the first ALC image and the second ALC image, and calculating an error value for the pair of ALC images based on the change in intensity over a plurality of pixels; and comparing the error values for each pair of ALC images and selecting an error-minimised image from the pair of ALC images having the lowest error value within the time window.

The first ALC image and the second ALC image may be temporally adjacent.

Comparing the error values between each pair of temporally adjacent ALC images and selecting an image from the pair of ALC images having the lowest error value may comprise: interpolating discrete error values of all temporally adjacent pairs of ALC images calculated within the time window to generate a continuous function over time, the continuous function defining a minimum error at a minimum error time; and selecting the ALC image generated closest to the minimum error time.

Calculating the error value for the pair of ALC images based on the change in intensity for each pixel may comprise one of: determining a sum of absolute changes in intensity for each of the plurality of pixels; determining a mean square deviation in changes in intensity for each of the plurality of pixels; determining an absolute mean of the change in intensity for each of the plurality of pixels; or selecting a maximum absolute change in intensity over the plurality of pixels.

The ALC images for which the errors are calculated may be ALC sub-images, each ALC sub-image corresponding to a portion of the primary image. The method may further comprise generating a reconstructed ALC image by splicing a plurality of different error-minimised ALC sub-images together.

The method may comprise performing feature detection either: after capturing the plurality of primary images to define a corresponding plurality of primary sub-images, and to generate a plurality of ALC sub-images, or after performing ambient light correction to define a plurality of ALC sub-images from the generated plurality of ALC images; each sub-image comprising a feature of interest.

A plurality of primary images may be captured continuously over the time window. The error value may be calculated dynamically in real time and the time window may end when the error value for a pair of ALC images falls below a predetermined first threshold.

A plurality of primary images may be captured continuously over the time window, and the error value may be calculated dynamically in real time. The time window may end when the error value falls below a first threshold, and then rises above a second threshold which is higher than the first threshold.

The method may comprise outputting the selected error-minimised image to a user interface. The method may comprise outputting the error value of the selected error-minimised image to the user interface.

Determining the change in intensity for each pixel may include determining a change in intensity for each colour channel in each pixel and aggregating the changes in intensity over the colour channels.

According to a second aspect, there is provided a non-transitory computer readable storage medium comprising computer-readable instructions that, when executed by a processor, causes the performance of a method in accordance with the first aspect.

According to a third aspect, there is provided a computer program that, when read by a computer, causes performance of a method in accordance with the first aspect.

According to a fourth aspect, there is provided an image capturing apparatus comprising: at least one processor; at least one memory comprising computer-readable instructions; the at least one processor being configured to read the computer readable instructions and cause performance of a method in accordance with the first aspect.

These and other aspects will be apparent from and elucidated with reference to the embodiments described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
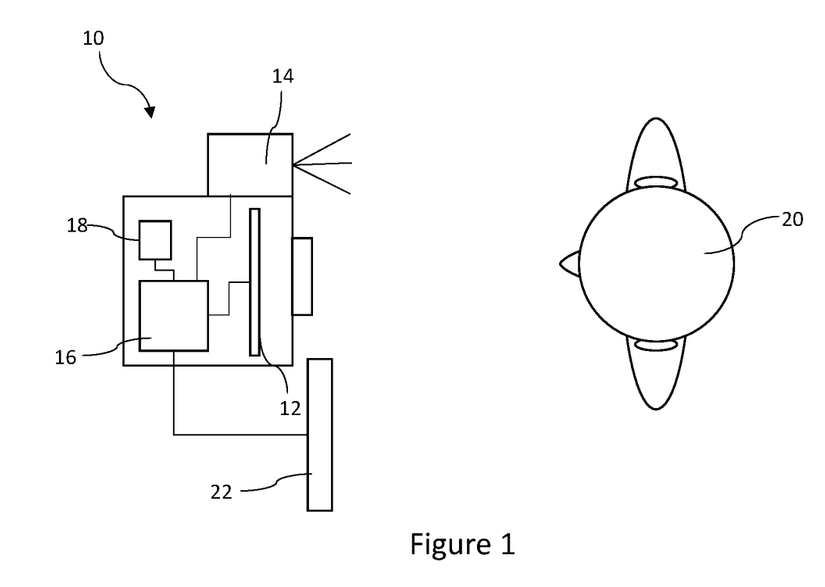
FIG. 1 schematically shows an image capturing apparatus for obtaining an ambient light corrected image have a minimised error due to motion.

FIG. 1 shows an image capturing apparatus 10 comprising an image capturing device 12, a light 14, a processor 16 and a memory 18 comprising computer readable instructions. The image capturing device 12 is connected to the processor 16 and is configured to capture images of an object 20, which in this example is a human, which can be read and processed by the processor 16.

The light 14 is configured to illuminate the object 20 and is also connected to the processor 16. The light 14 is configured to emit variable intensity of illumination which is controlled by the processor 16. In other examples, the light 14 may be connected to, and controlled by a separate controller.

The memory 18 comprises computer readable instructions and the processor 16 is configured to read the computer readable instructions to perform a method for minimising error in ambient light corrected (ALC) images.

Figure 2:
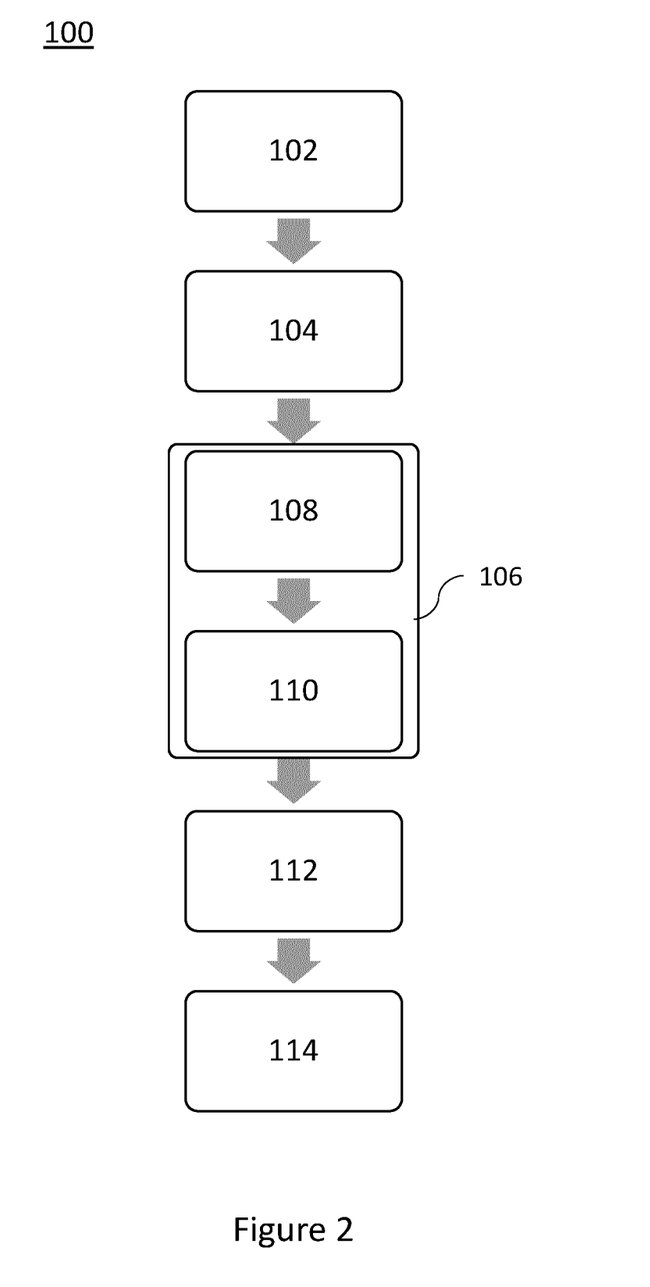
FIG. 2 is a flow chart showing steps of a first example method for obtaining an ambient light corrected image having a minimised error due to motion.
Figure 3:
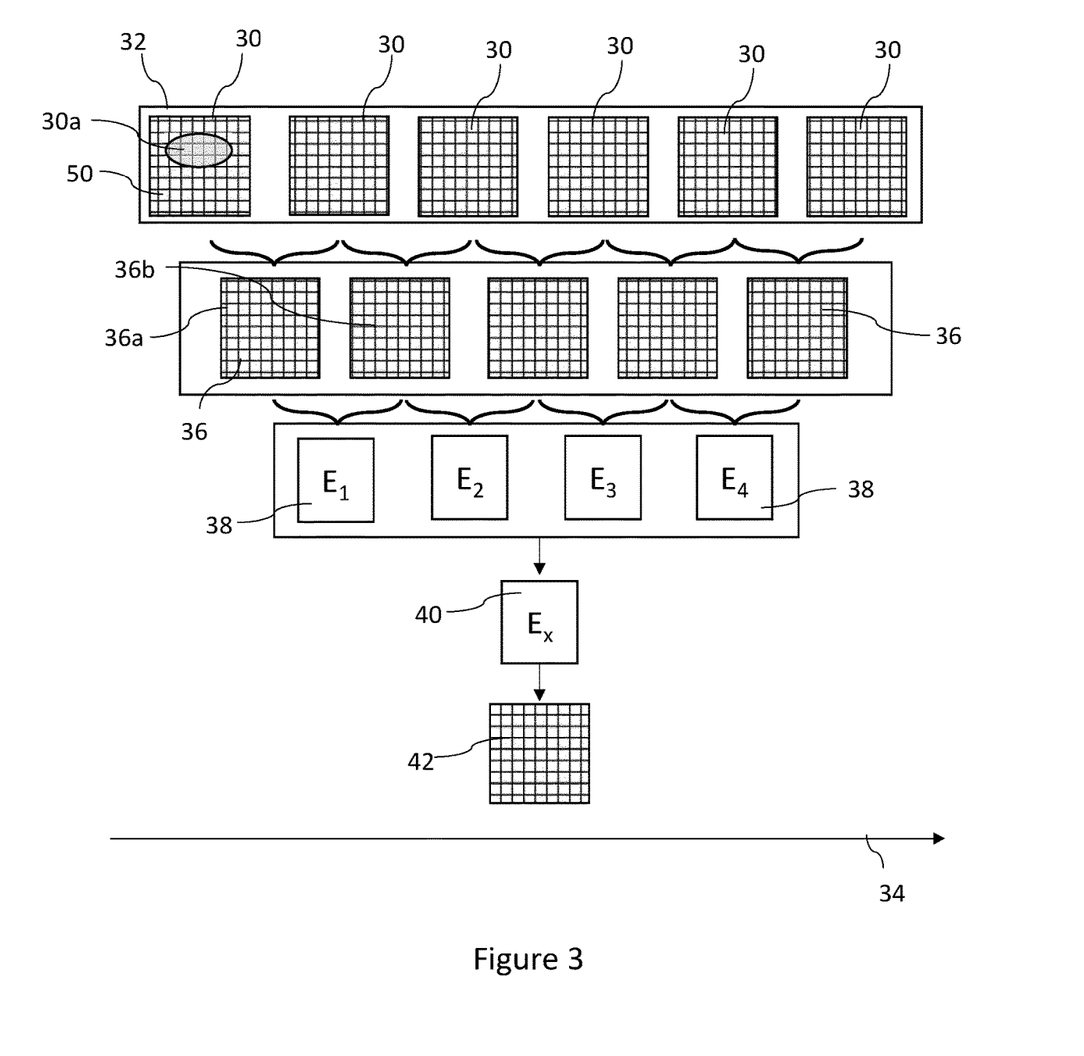
FIG. 3 schematically shows steps of the first example method.

FIG. 2 is a flow chart showing steps of a first example method 100 of obtaining an ALC image having a minimised error due to motion. FIG. 3 shows the steps of the method in terms of the outputs of captured and processed images.

In block 102, the method comprises capturing a plurality of primary images 30 of the object 20 over a time window 32 illuminated by the light 14, which illumination is controlled to vary over time. In FIG. 3, the passage of time is represented by the arrow 34. Each primary image 30 comprises a plurality of pixels 50 which each have a pixel index corresponding to the location of the pixel 50 in the image, and a pixel value defining the intensity of the light captured at that pixel 50.

In block 104, following block 102, the method 100 comprises performing ambient light correction on at least a portion of the plurality of primary images 30 to generate a plurality of ALC images 36. Ambient light correction of primary images 30 involves adjusting the intensity of pixels 50 in the captured primary images 30 to correct for ambient light which illuminates the object 20. A sub-set of primary images 30, which are captured with differing controlled illumination, can be demodulated to generate an ALC image 36. In a simplified example of ambient light correction by demodulation, a first primary image may be captured with the light switched on to illuminate the object, and a second primary image may be captured with the light switched off such that only ambient light illuminates the object. For each pixel of the first primary image, the intensity of the second primary image at that pixel can be subtracted to generate an ALC pixel, and combining all of the ALC pixels generates the ALC image. A more complex example of ambient light correction by demodulation can be found in Kolaman, Amir & Hagege, Rami & Guterman, Hugo. (2014). Light source separation from image sequences of oscillating lights. 2014 IEEE 28th Convention of Electrical and Electronics Engineers in Israel, IEEEI 2014. 1-5. 10.1109/EEEI.2014.7005874, or a further example in which a time varying signal for each pixel in the image sequence is multiplied with a modulation function relating to the periodically varying controlled, active illumination, followed by a low-pass filter operation which results in the amplitude of the periodically varying incoming light. This amplitude is proportional to the amount of reflection of light by the object, and is used to extract an ALC image in which the ambient light intensity or amplitude has been removed.

In this example, each ALC image 36 is generated based on demodulating a pair of temporally adjacent primary images 30. In other words, the sub-set of primary images 30 which are demodulated to generate a single ALC image 36 comprises two primary images 30. Therefore, each primary image 30 is used in the generation of two temporally adjacent ALC images 36. In other examples, each ALC image may be generated based on demodulating more than two primary images.

In this example, each ALC image 36 is generated from a sub-set of primary images 30 which is offset by one primary image 30 from a preceding sub-set of primary images 30 used to generate another ALC image 36. In other examples, there may be an offset of more than one primary image for each sub-set of primary images.

In the example shown in FIG. 3, there are six primary images 30 captured, and each pair of temporally adjacent primary images 30 is demodulated to generate five ALC images 36.

ALC images 36 generated by demodulating two or more primary images 30 can have errors introduced due to movement of the object 20 while the two or more primary images 30 are captured. The following steps of the method 100 are intended to select an ALC image 36 from a plurality of ALC images 36 which has the lowest error.

In block 106, the method 100 comprises calculating an error value 38 for pairs of ALC images 36. The calculation of the error value 38 for a pair of ALC images 36 will be described below with reference to a single pair of ALC images 36 comprising a first ALC image 36a and a second ALC image 36b, to calculate error value $E_1$, as shown in FIG. 3. It will be appreciated that these steps can be repeated for every pair of ALC images 36 for which an error value 38 is to be calculated.

In this example, the first ALC image 36a is temporally adjacent to the second ALC image 36b. In other examples, error values may be calculated for pairs of non-temporally adjacent ALC images.

Block 106 of the method 100 comprises block 108 and block 110. In block 108, each pixel 50 of the first ALC image 36a is compared with a corresponding pixel 50, having the same pixel index, of the second ALC image 36b, and a change in intensity is determined for each pixel 50 between the first ALC image 36a and the second ALC image 36b.

In some examples, if each pixel comprises a plurality of colour channels, then determining the change in intensity for each pixel may comprise determining a change in intensity for each colour channel in the respective pixel and aggregating the changes in intensity over the colour channels.

In block 110, the error value $E_1$ is calculated between the first ALC image 36a and the second ALC image 36b based on the change in intensity over a plurality of pixels 50. In this example, the change in intensity for each pixel 50 between the first ALC image 36a and the second ALC image 36b is aggregated by determining a sum of absolute changes in intensity of the plurality of pixels 50. This sum is used to determine the error value $E_1$. In other examples, the error value may be determined by aggregating the change in intensity values over the plurality of pixels by other means, such as determining a mean square deviation in changes in intensity over the plurality of pixels, or determining an absolute mean of the change in intensity of each of the plurality of pixels. In yet further examples, the error value may be determined simply based on selecting a maximum absolute change in intensity over the plurality of pixels 50. Selecting a maximum absolute change in intensity may be useful to assign larger errors to pairs of ALC images in which there is a low error throughout the images, but a large distortion in a small area of the ALC images. The plurality of pixels 50 from which the error value 38 is calculated comprises all of the pixels 50 in the whole ALC image in this example. However, in other examples, the plurality of pixels may only comprise a sub-set of all of the pixels in the ALC images such as a central portion of the ALC images, or a sub-set of pixels corresponding to a feature of interest (described in more detail in FIGS. 7a and 7b below).

In block 112, the method 100 comprises comparing the error values 38 for each pair of ALC images 36, and selecting an error minimised pair of ALC images 40 having the lowest error value $E_x$. An error minimised image 42 may then be selected from the error minimised pair of ALC images 40. This may be one of the ALC images 36 of the error-minimised pair of ALC images 40 selected arbitrarily or following a condition, or it may be both of the ALC images 36 of the error-minimised pair of ALC images 40.

Referring back to FIG. 1, the image capturing apparatus 10 comprises a user interface 22 which is connected to the processor 16. The connection may be wired or wireless. The user interface 22 may display the error minimised pair of ALC images 40 or the selected error minimised image 42. The user interface 22 may additionally or alternatively display the error value $E_x$ of the selected error minimised image 42.

The first example method 100 may further comprise block 114, which comprises outputting the selected error minimised image 42 to the user interface 22 and/or outputting the error value of the selected error minimised image 42 to the user interface 22. In other examples, block 114 may be omitted.

In the first example method 100, the plurality of primary images 30 may be captured over a predetermined time window 32 and analysed after all of the primary images 30 are captured. In some examples, the primary images 30 may be captured continuously over the time window and the ALC images 36 may be generated dynamically during capturing of subsequent primary images 30. The error value 38 may also be calculated dynamically in real time while subsequent ALC images 36 are being generated and primary images 30 are being captured.

Although it is described that an error value is calculated for a pair of whole ALC images 36, in some examples, the primary images 30 and/or the ALC images 36 may be divided into sub-images to generate ALC sub-images each corresponding to a portion of the primary images. Error values may then be calculated for pairs of ALC sub-images to select an error-minimised ALC sub-image, for example as described with reference to FIGS. 7a and 7b, or sub-images corresponding to portions of the primary images may be selected in any other suitable manner such as by dividing each image into predetermined blocks of pixels, with each block of pixels being a single ALC sub-image. In such examples, a full error-minimised ALC image may be generated or reconstructed by splicing together a plurality of error-minimised ALC sub-images, where each of the error-minimised ALC sub-images corresponds to a different portion of the primary images. This may be particularly useful if different portions of the object images by primary images are subject to different amounts of motion or movement.

Figure 4:
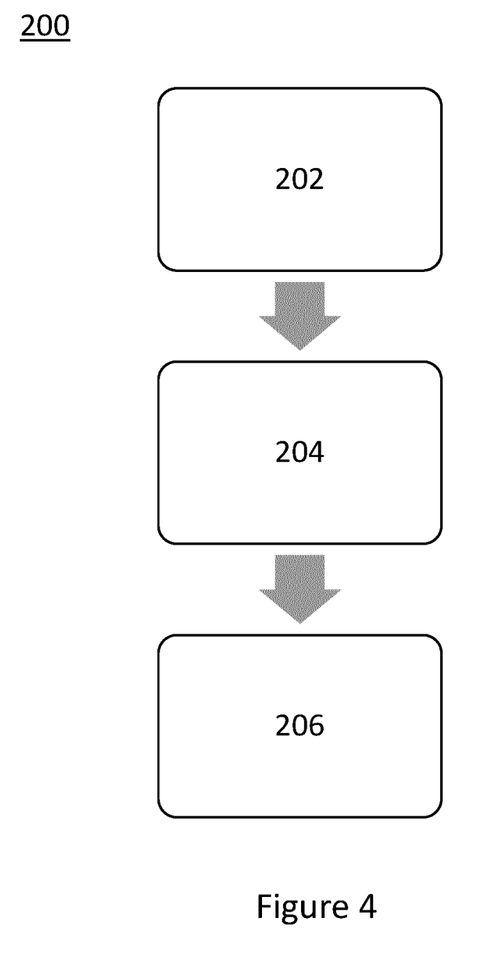
FIG. 4 is a flow chart showing steps of a second example method of selecting an error minimised image from an error minimised pair of ambient light corrected images.

FIG. 4 is a flow chart showing steps of a second example method 200 of selecting a single error minimised image 42 from the error minimised pair of ALC images 40.

Figure 5:
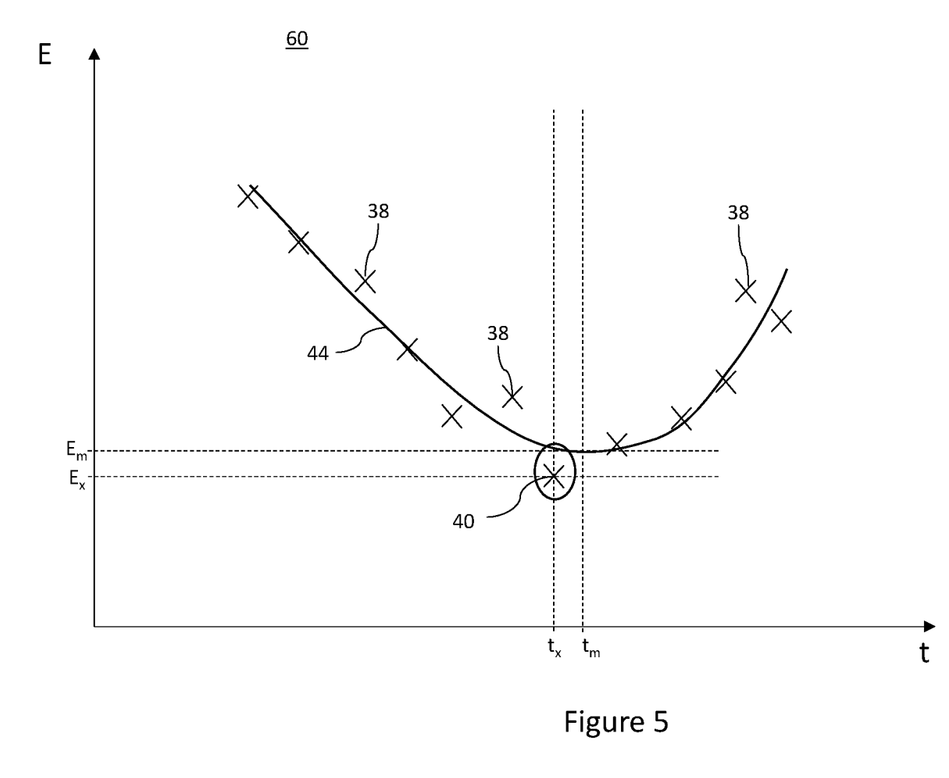
FIG. 5 is a graph illustrating steps of the second example method.

FIG. 5 shows a visual representation of the steps of the method 200 of selecting the error minimised image 42 from the error minimised pair of ALC images 40 in the form of an example plot 60. The plot 60 comprises an x-axis of time, t, and a y-axis of error value, E.

Each error value 38 of the pairs of ALC images 36 is plotted against a time, t, corresponding to a time that each primary image 30 was captured from which each of the respective pair of ALC images 36 was generated. For example, each ALC image 36 is generated, in this example, from two temporally adjacent primary images 30, and therefore each pair of ALC images 36 is generated from three temporally adjacent primary images 30. The time, t, against which each error value 38 is plotted may be any time within the time that the three temporally adjacent primary images 30 are captured, such as the time that the middle primary image 30 is captured, or a time at a midpoint between the temporal ends of the three temporally adjacent primary images 30. It will be appreciated that in other examples, there may be more than three primary images associated with each pair of ALC images, and that the time against which a respective error value is plotted can relate in any suitable way to the times that the associated primary images were captured.

In block 202, the method 200 comprises interpolating discrete error values 38 of a plurality of pairs of temporally adjacent ALC images 36 calculated within the time window 32 to generate a continuous function 44 of error values 38 over time.

The lowest discrete error value 38 having a point at ($t_x$, $E_x$) in FIG. 5 is the corresponding error value 38 of the error minimised pair of ALC images 40. The continuous function 44 defines a minimum error $E_m$ at a minimum error time $t_m$. In this example, there is only one minimum error $E_m$ at one minimum error time $t_m$. However, it will be appreciated that there may be more than one minimum error defined by the continuous function having a gradient of zero between a preceding negative gradient and an ensuing positive gradient.

In block 204, the method 200 comprises finding the minimum error time $t_m$. In some examples, where there is more than one minimum error time $t_m$, block 204 may comprise finding the minimum error time $t_m$ which his closest in time to the time, $t_x$, of the error minimised pair of ALC images 40.

In block 206, the method 200 comprises selecting the error minimised image 42 that is closest to the minimum error time $t_m$ from the error minimised pair of ALC images 40. In other words, selecting the error minimised image 42, from the error minimised pair of ALC images 40, that is generated from primary images 30 which are temporally closest to the minimum error time $t_m$. In short, if $t_m$ is larger than $t_x$, then the error minimised image 42 is selected as the later of the pair of ALC images 40. If $t_m$ is smaller than $t_x$, then the error minimised image 42 is selected as the earlier of the pair of ALC images 40.

Figure 6:
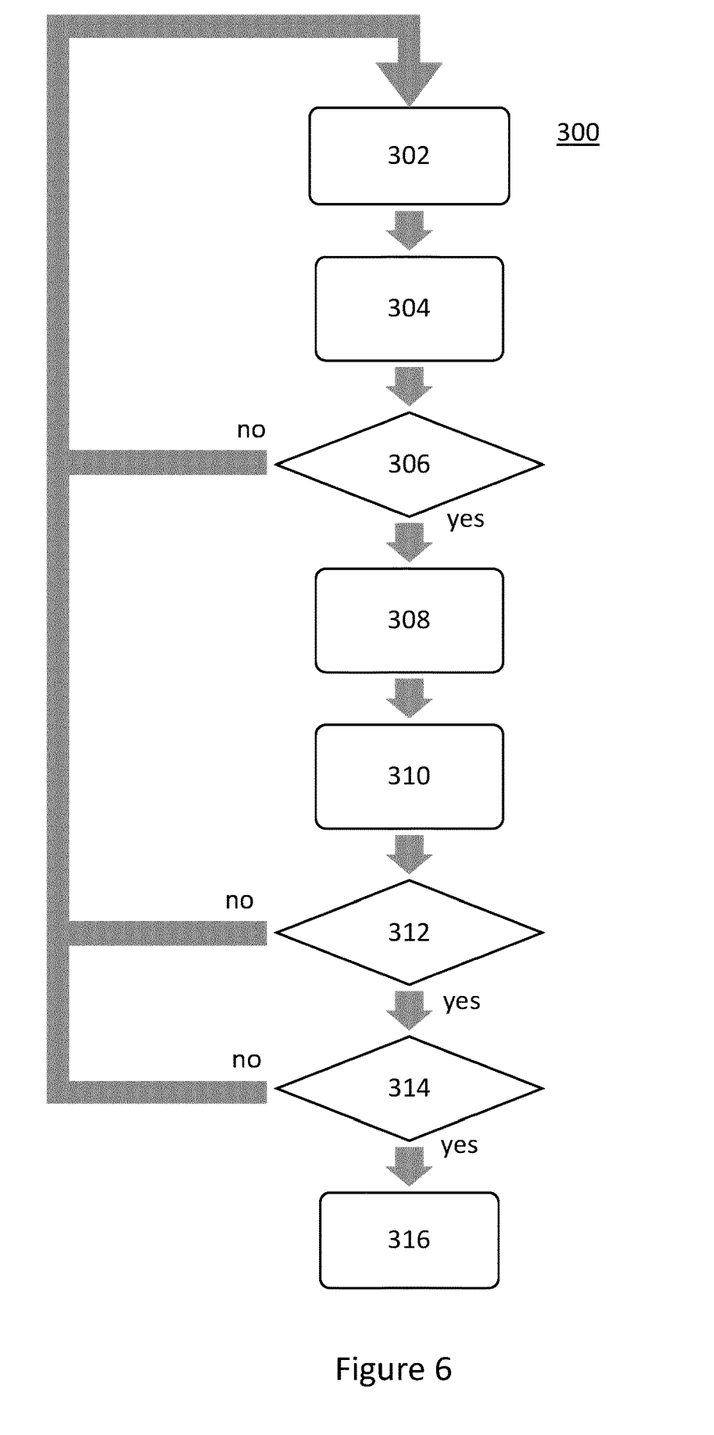
FIG. 6 is a flow chart showing steps of a third example method for selecting an ambient light corrected image with a minimised error.

FIG. 6 is a flow chart showing steps of a third example method 300 for minimising the error in ALC images 36 due to motion. Referring back to FIG. 3, the third example method 300 produces the same basic outputs at various steps as the first example method 100, and therefore the description below will refer to the reference numerals of FIG. 3.

In block 302, the third example method 300 comprises capturing a plurality of primary images 30 of the object 20 with controlled varying illumination of the object 20 from the light 14 over time. The method 300 comprises continuously capturing primary images 30 and analysing them in real time in the subsequent steps of the method 300.

In block 304, following block 302, the method 300 comprises performing ambient light correction to generate an ALC image 36 by demodulating at least a sub-set of the plurality of primary images 30 captured.

In block 306, following from block 304, the method 300 comprises determining whether there have been at least two ALC images 36 generated. If there have not been at least two ALC images 36 generated, the method 300 returns to block 302 to capture further primary images 30 and to generate a further ALC image 36 from a later sub-set of primary images 30, offset by one temporally adjacent primary image 30 from which the preceding ALC image 36 was generated. In other examples, the offset may be more than one temporally adjacent primary image.

If it is determined in block 306 that there are at least two ALC images 36, the method moves to block 308, in which the error value 38 of a pair of ALC images 36 is calculated, where the pair of ALC images 36 includes the two most recently generated ALC images 36. Block 308 includes the same steps as block 106 in the first example method 100 to calculate the error value 38 of the pair of ALC images 36. The calculated error value 38 is stored in the memory 18 together with the pair of ALC images 36 to which it refers.

In block 310, following block 308, the method 300 comprises comparing stored error values 38 for pairs of ALC images 36 and determining the lowest error value 38. In block 312, following block 310, the method 300 comprises determining whether the lowest error value 38 is below a first threshold. If the lowest error value 38 does not fall below the first threshold, the method returns to block 302 to capture further primary images 30 and to generate another ALC image 36 from a sub-set of primary images 30 temporally adjacent to the sub-set of primary images from which the preceding ALC image 36 was generated.

If the lowest error value 38 is below the first threshold, the method 300 moves to block 314, in which it is determined whether the latest error value 38 associated with the latest pair of ALC images 36 generated is above a second threshold. The second threshold is higher than the first threshold. If the latest error value 38 is not above the second threshold, the method 300 returns to block 302 to capture more primary images 30 and to generate another ALC image 36 from a sub-set of primary images temporally adjacent to the sub-set of primary images from which the preceding ALC image 36 was generated. If the latest error value 38 is above the second threshold, the method continues to block 316 in which the time window 32 ends and an error minimised pair of ALC images 40 having the lowest error value $E_x$ is selected. An error minimised image 42 may then be selected from the error minimised pair of ALC images 40 in a similar manner to block 112 described with reference to the first example method 100.

In other examples, the method may move to block 316 after block 312, when it is determined that the lowest error value 38 falls below the first threshold. Using the additional step in block 314 can ensure that the process is not stopped as soon as an error value 38 falls below the first threshold. This is particularly helpful if motion of the object 20 slows down over an extended time period, in which case, there may be pairs of ALC images 36 which can be generated with lower error values if the method is not immediately stopped when the first threshold is met. Waiting until the error values exceed a second threshold, higher than the first threshold ensures that the object 20 is no longer slowing down.

In this example, it has been described that a single ALC image 36 is generated in block 304. It will be appreciated that any suitable number of ALC images 36 may be generated in one go at block 304 and that the second example method may continue by analysing any number of ALC images generated in block 304.

Figure 7A:
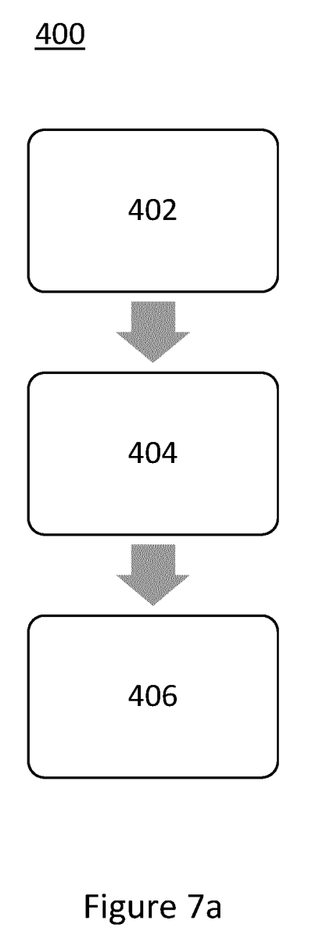
FIGS. 7a and 7b are flow charts showing steps of a first and second example sub-methods respectively for minimising error in ambient light corrected images.
Figure 7B:
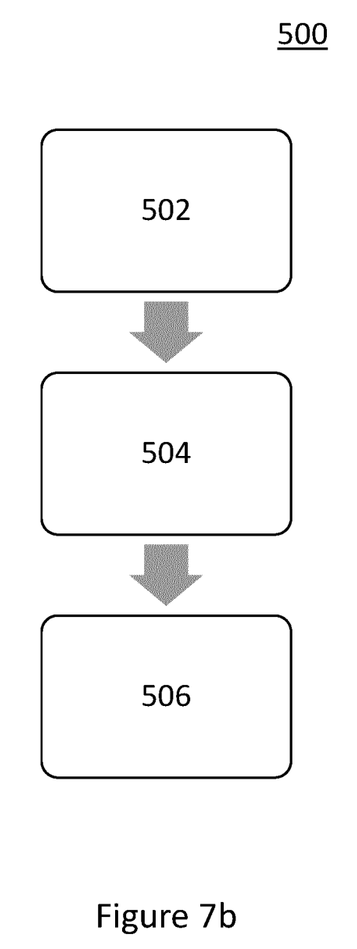

FIGS. 7a and 7b are flow charts showing first example sub-method 400 and second example sub-method 500 respectively for replacing blocks 102-104 in the first example method 100 and blocks 302-304 in the second example method 300.

The first example sub-method 400 and the second example sub-method 500 are intended to define areas of interest in the ALC images 36 which can be analysed for an error value 38 instead of the whole ALC image 36.

In the first example sub-method 400, block 402 comprises capturing a plurality of primary images 30 in a similar manner to block 102 in the first example method 100 or block 302 in the second example method 300.

In block 404, following from block 402, the sub-method 400 comprises performing feature detection of the object 20 to define a plurality of primary sub-images 30a (shown best in FIG. 3).

In this example, the object 20 is a human, and the feature detection may include identifying particular features of interest, such as an area around the eyes of the human, the cheeks of the human or the forehead of the human. Each primary sub-image 30a may therefore comprise a feature of interest.

In block 406, following from block 404, the sub-method 400 comprises performing ambient light correction on the plurality of primary sub-images 30a from the plurality of primary images to generate a plurality of ALC sub-images. The first example sub-method 400 may then continue to block 106 of the first example method 100 or may continue to block 306 or 308 of the second example method 300, in which the comparison of ALC-images is instead a comparison of the ALC sub-images.

In the second example sub-method 500, block 502 comprises capturing a plurality of primary images 30 in a similar manner to block 102 in the first example method 100 or block 302 in the second example method 300.

In block 504, the sub-method 500 comprises performing ambient light correction to generate a plurality of ALC images 36. The sub-method 500 then moves on to block 506.

In block 506, the sub-method 500 comprises performing feature detection of the object 20 in the ALC images 36 to define a plurality of ALC sub-images. In this example, the object 20 is a human, and the feature detection may include identifying particular features of interest, such as an area around the eyes of the human, the cheeks of the human or the forehead of the human. Each ALC sub-image may therefore comprise a feature of interest. The second example sub-method 500 may then continue to block 106 of the first example method 100 or may continue to block 306 or 308 of the second example method 300, in which the comparison of ALC-images is instead a comparison of the ALC sub-images.

The methods described herein are based on the assumption that, the more a generated image differs in two ALC images 36, the larger the error will be in each ALC image 36. Therefore, rather than calculating motion of an object 20 and trying to correct the actual error introduced into an ALC image by that motion, the methods produce the ALC images, and select the ALC image or pair of ALC images with the lowest estimated error.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for obtaining an ambient light correction (ALC) image having a minimised error due to motion, the method comprising:
    capturing a plurality of primary images of an object over a time window, with controlled illumination of the object varying in intensity over time;
    performing ambient light correction on at least a portion of the plurality of primary images to generate a plurality of ALC images, each ALC image being generated based on demodulating a sub-set of the plurality of primary images by determining, from the sub-set of primary images with differing controlled illumination, an intensity of ambient light, and generating the ALC image by removing the ambient light intensity from at least one image in the sub-set of primary images;
    calculating an error value for pairs of ALC images, each pair of ALC images including a first ALC image and a second ALC image;
    comparing the error values for each pair of ALC images and determining a pair of ALC images which has the lowest error value within the time window; and
    selecting an ALC image as an error-minimised image from the determined pair of ALC images having the lowest error value within the time window,
    wherein calculating the error value comprises:
    comparing each pixel of the first ALC image with a corresponding pixel of the second ALC image, and determining a change in intensity for each pixel between the first ALC image and the second ALC image, and
    calculating the error value for the pair of ALC images based on the change in intensity over a plurality of pixels.

2. A method according to claim 1, wherein the first ALC image and the second ALC image are temporally adjacent.

3. A method according to claim 2, wherein comparing the error values between each pair of temporally adjacent ALC images and selecting an image from the pair of ALC images having the lowest error value comprises:
    interpolating discrete error values of all temporally adjacent pairs of ALC images calculated within the time window to generate a continuous function over time, the continuous function defining a minimum error at a minimum error time; and
    selecting the ALC image generated closest to the minimum error time.

4. A method according to claim 1, wherein calculating the error value for the pair of ALC images based on the change in intensity for each pixel comprises one of:
    determining a sum of absolute changes in intensity for each of the plurality of pixels;
    determining a mean square deviation in changes in intensity for each of the plurality of pixels;
    determining an absolute mean of the change in intensity for each of the plurality of pixels; or
    selecting a maximum absolute change in intensity over the plurality of pixels.

5. A method according to claim 1, wherein the ALC images for which the errors are calculated are ALC sub-images, each ALC sub-image corresponding to a portion of the primary image, to thereby select an error-minimised ALC sub-image.

6. A method according to claim 5, further comprising generating a reconstructed ALC image by splicing a plurality of different error-minimised ALC sub-images, corresponding to different portions of primary images, together.

7. A method according to claim 5, comprising performing feature detection either:
    after capturing the plurality of primary images to define a corresponding plurality of primary sub-images, and to generate the plurality of ALC sub-images, or
    after performing ambient light correction to define the plurality of ALC sub-images from the generated plurality of ALC images;
    each sub-image comprising a feature of interest.

8. A method according to claim 1, wherein the plurality of primary images are captured continuously over the time window, and wherein the error value is calculated dynamically in real time and the time window ends when the error value for a pair of ALC images falls below a predetermined first threshold.

9. A method according to claim 1, wherein the plurality of primary images are captured continuously over the time window, and wherein the error value is calculated dynamically in real time and the time window ends when the error value falls below a first threshold, and then rises above a second threshold which is higher than the first threshold.

10. A method according to claim 1, wherein the method comprises outputting the selected error-minimised image to a user interface.

11. A method according to claim 10, wherein the method comprises outputting the error value of the selected error-minimised image to the user interface.

12. A method according to claim 1, wherein determining the change in intensity for each pixel includes determining a change in intensity for each colour channel in each pixel and aggregating the changes in intensity over the colour channels.

13. A non-transitory computer readable storage medium comprising computer-readable instructions that, when executed by a processor, causes the performance of a method in accordance with claim 1.

14. An image capturing apparatus comprising:
  at least one processor;
  at least one memory comprising computer-readable instructions;
  the at least one processor being configured to read the computer readable instructions and cause performance of a method in accordance with claim 1.

* * * * *